(12) United States Patent
Becker (10) Patent No.: US 8,015,470 B2
(45) Date of Patent: Sep. 6, 2011

(54) APPARATUS AND METHOD FOR DECODING BURSTS OF CODED INFORMATION

(75) Inventor: Christopher J. Becker, Palatine, IL (US)

(73) Assignee: Freescale Semiconductor, Inc., Austin, TX (US)

(*) Notice: Subject to any disclaimer, the term of this patent is extended or adjusted under 35 U.S.C. 154(b) by 1083 days.

(21) Appl. No.: 11/779,499

(22) Filed: Jul. 18, 2007

(65) Prior Publication Data

US 2009/0024901 A1 Jan. 22, 2009

(51) Int. Cl.
G11C 29/00 (2006.01)
(52) U.S. Cl. .......................................... 714/763; 714/762
(58) Field of Classification Search ............... 340/12.17; 711/168; 710/35; 714/794, 762, 763
See application file for complete search history.

(56) References Cited

U.S. PATENT DOCUMENTS

| 4,866,434 | A | * | 9/1989 | Keenan | ................. 340/12.17 |
| 6,904,505 | B1 | * | 6/2005 | Peel et al. | .................... 711/168 |
| 7,587,529 | B2 | * | 9/2009 | Lee et al. | ...................... 710/35 |
| 7,856,587 | B2 | * | 12/2010 | Oren | ............................ 714/762 |
| 7,900,123 | B2 | * | 3/2011 | Shieh | ........................... 714/794 |

* cited by examiner

*Primary Examiner* — David Ton
(74) *Attorney, Agent, or Firm* — Vedder Price P.C.

(57) ABSTRACT

A decoding circuit includes a mixed modulation memory access circuit responsive to burst rejection information. The mixed modulation memory access circuit selectively accesses burst memory locations containing a valid burst of coded bits. The mixed modulation memory access circuit selectively avoids accessing burst memory locations containing a rejected burst of coded bits based on the burst rejection information. In one example, the mixed modulation memory access circuit accesses the valid burst when the burst rejection information indicates that the memory location contains valid bursts. In one example, the mixed modulation memory access circuit generates zero confidence information when the burst rejection information indicates that the memory location contains rejected bursts.

22 Claims, 7 Drawing Sheets

APPARATUS AND METHOD FOR DECODING BURSTS OF CODED INFORMATION

BACKGROUND

1. Field

This disclosure relates generally to wireless communications systems, and more specifically, to methods and apparatus for decoding information in wireless communication systems.

2. Related Art

A wireless communication system includes a transmitting device and a receiving device. The transmitting device encodes data into bursts of coded bits. The bursts of coded bits are interleaved into a logical channel according to an interleaving scheme. For example, if the wireless network is an Enhanced General Packet Radio Service Network (E-GPRS) network or an Enhanced Data Rates for GSM Evolution (EDGE) network, the logical channel may include four bursts of coded bits. The logical channel is modulated and transmitted to the receiving device.

Figure 1A:
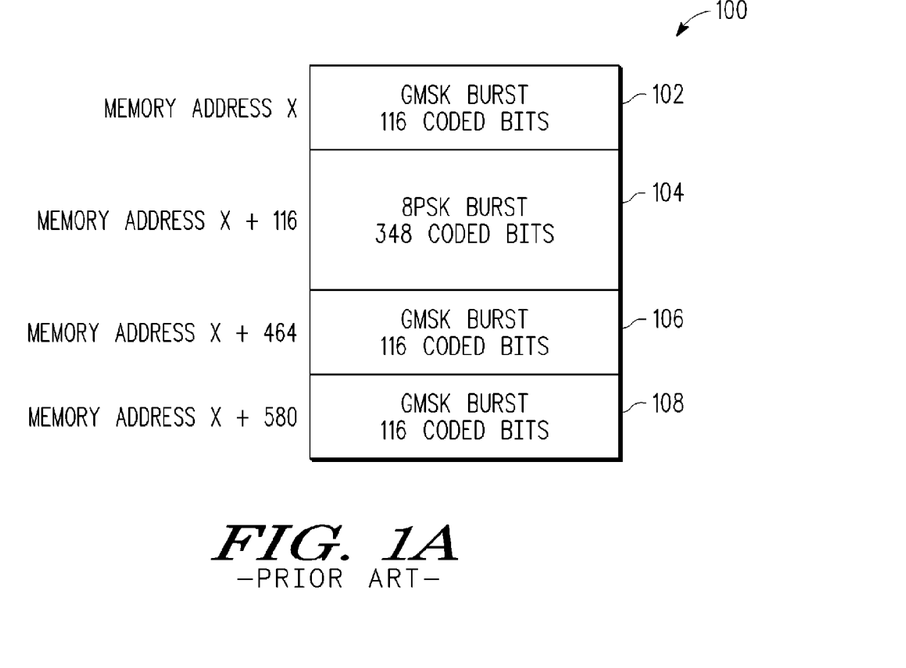
FIG. 1A is an exemplary block diagram of a contiguous block of memory containing multiple bursts of coded data according to one known technique.

The receiving device receives the logical channel and demodulates each burst of coded bits independently. When demodulated, the bursts of coded bits are stored in contiguous memory partitions. Each burst of the logical channel must be of the same modulation type and therefore must include the same number of coded bits. However, in some situations, each burst of the logical channel received does not have the same modulation type as shown in FIG. 1A due to noise or other corruption for example.

In this example, a contiguous memory partition 100 includes four bursts of coded bits 102, 104, 106, and 108. Bursts 102, 106, and 108 are detected by the receiving device as being modulated using GMSK while burst 104 is detected as being modulated using 8PSK. The receiving device determines which modulation type was used by the transmitting device to modulate the logical channel. The receiving device determines the modulation type by a majority vote of the bursts of coded bits received. For example, if three bursts are of a first modulation type and one burst is of a second modulation type, the receiving device determines that the modulation type is the first modulation type. Therefore, in this example, the receiving device determines the modulation type to be GMSK.

Figure 1B:
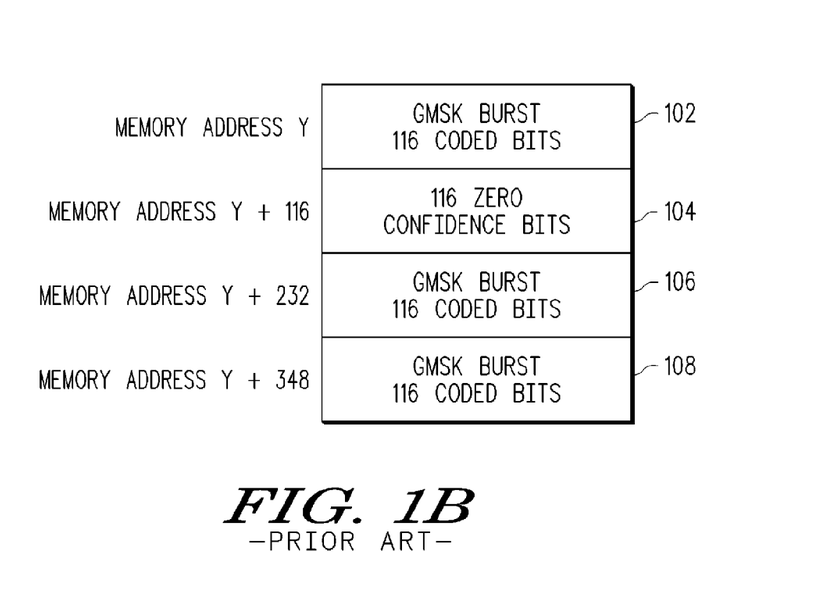
FIG. 1B is an exemplary block diagram of a contiguous block of memory containing multiple bursts of coded data when an invalid burst has been overwritten according to one known technique.

The bursts of coded bits having a different modulation type (e.g. burst 104) than the majority (e.g., bursts 102, 106, and 108) are then overwritten in system memory with zero confidence information corresponding to the majority modulation type as shown in FIG. 1B. Since the majority modulation type in this example is GMSK, burst 104 is overwritten with 116 zero confidence bits. In addition, since each modulation type includes a different amount of information (e.g., a GMSK modulated burst includes 116 coded bits and an 8PSK modulated burst includes 348 coded bits), the receiving device adjusts the memory location of each burst of coded bits so that they are contiguous in system memory as shown in FIG. 1B.

Overwriting the burst of coded bits having a different modulation type and adjusting the memory location of each of the burst of coded bits consumes valuable system resources and time, which is undesirable. Therefore, it would be desirable, among other things, to provide for a more efficient and streamlined method of decoding bursts of coded bits that have multiple modulation types (e.g., detected or having been modulated using one of a plurality of different modulation schemes).

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In one example, a decoding circuit includes a mixed modulation memory access circuit responsive to burst rejection information. The mixed modulation memory access circuit selectively accesses burst memory locations containing a valid burst of coded bits. The mixed modulation memory access circuit selectively avoids accessing burst memory locations containing a rejected burst of coded bits based on the burst rejection information. In one example, the mixed modulation memory access circuit accesses the valid burst when the burst rejection information indicates that the memory location contains valid bursts. In one example, the mixed modulation memory access circuit generates zero confidence information when the burst rejection information indicates that the memory location contains rejected bursts. A related method is also disclosed.

The circuit and method provide, among other advantages, a more efficient and streamlined method of decoding bursts of coded bits since rejected bursts of coded bits are not overwritten. In addition, the circuit and method is more efficient and streamlined since memory locations of each burst of coded bits are not adjusted to ensure that they are contiguous in system memory. Other advantages will be recognized by those of ordinary skill in the art.

In one example, the decoding circuit includes a depuncturer and a decoder. The depuncturer generates depunctured information based on the valid burst and/or the zero confidence information. The decoder generates decoded information based on the depunctured information. In one example, the decoding circuit includes a burst rejection register operatively coupled to the mixed modulation memory access circuit. The burst rejection register stores the burst rejection information.

In one example, the decoding circuit includes memory operatively coupled to the mixed modulation memory access circuit. The memory stores a contiguous block of coded bits. The contiguous block of coded bits includes the valid burst of coded bits and/or the rejected burst of coded bits. In one example, the burst rejection information indicates whether a burst of coded bits stored in the contiguous block is one of valid and rejected. In one example, the burst of coded bits is valid when a majority of coded bits stored in the contiguous block have a same modulation type as the burst of coded bits.

In one example, the decoding circuit includes a mixed modulation memory access circuit. The mixed modulation memory access circuit includes a mapping module, a burst rejection module, an address offset module, and an address generator. The mapping module assigns each coded bit of a stream of coded bits a burst identifier and a bit identifier. The burst rejection module is operatively coupled to the mapping module. The burst rejection module determines whether a burst of coded bits is valid or rejected based on the burst rejection information and the burst identifier. The address offset module determines a memory address offset based on the burst identifier and the burst rejection information. The address generator is operatively coupled to the address offset module. The address generator determines a memory read address based on the memory address offset and the bit identifier. The mixed modulation memory circuit accesses the burst memory locations containing the valid burst based on the memory read address.

In one example, a mixed modulation decoding circuit includes a processor and the decoding circuit. The processor includes a burst rejection generator that generates burst rejection information based on a modulation type for each burst of coded bits of a logical channel. In one example, the decoded information is processed by the processor to generate output information for a user interface.

As used herein, the terms "module," "circuit," and/or "stage" can include one or more processors (e.g., shared, dedicated, or group of processors such as but not limited to microprocessors, DSPs, or central processing units) and memory that execute one or more software or firmware programs, combinational logic circuits, FPGAs, ASICs, state machines, and/or other suitable components that provide the described functionality. In addition, the term "signal" may refer to analog or digital information.

Figure 2:
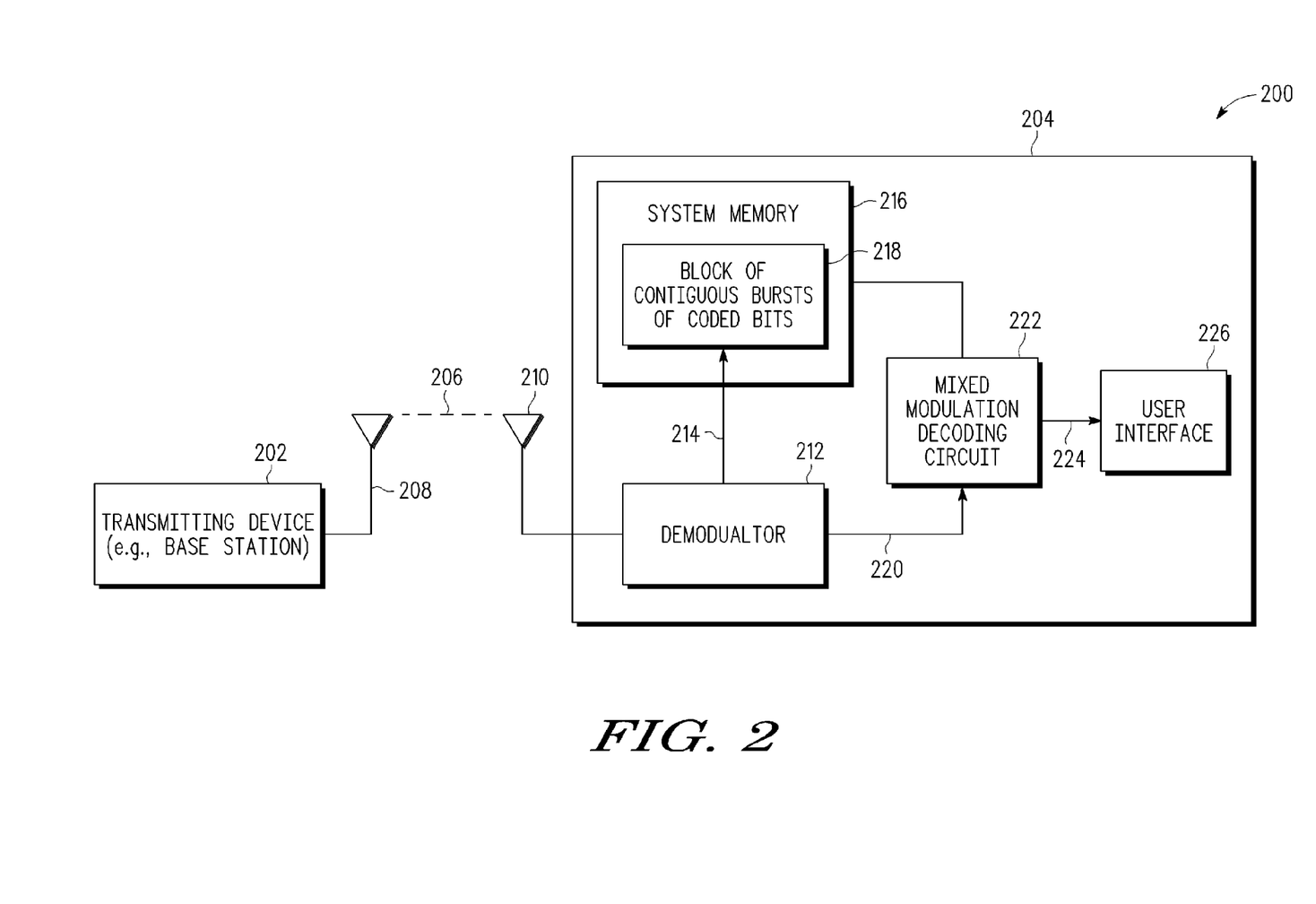
FIG. 2 is an exemplary functional block diagram of a wireless communication system using a mixed modulation decoding circuit in accordance with one embodiment of the present disclosure.

Referring now to FIG. 2, an exemplary functional block diagram of a wireless communication system 200 is depicted. The wireless communication system 200 includes a transmitting device 202 such as a base station or other suitable device and a receiving device 204 such as a mobile station or other suitable device. The transmitting device 102 encodes data into bursts of coded bits. The bursts of coded bits are interleaved into a logical channel according to an interleaving scheme. For example, if the wireless network is an Enhanced General Packet Radio Service Network (E-GPRS) network or an Enhanced Data Rates for GSM Evolution (EDGE) network, the logical channel may include four bursts of coded bits. The transmitting device 202 generates a modulated logical channel 206 by modulating the logical channel. The transmitting device 202 transmits the modulated logical channel 206 via interface 208 such as an antenna or other suitable interface.

The receiving device 204 receives the modulated logical channel 206 (e.g., time slots, codes, frequencies or other channels) via interface 210 such as an antenna or other suitable interface. A demodulator 212 demodulates the modulated logical channel 106 into a logical channel 214 that includes multiple bursts of coded bits (e.g., 4 bursts of coded bits). The demodulator 212 communicates the logical channel 214 to system memory 216, which is stored as a block of contiguous data 218 in system memory 126. The demodulator 212 also determines a modulation type 220 for each of the bursts of coded bits included in the logical channel 214. For example in an EDGE or E-GPRS network, the modulation type 220 can be either GMSK or 8-PSK as is known in the art. Once determined, the modulation type 220 is communicated to a mixed modulation decoding circuit 222.

The mixed modulation decoding circuit 222 determines which bursts of the logical channel 214 are valid and which are invalid (i.e., rejected) based on the modulation type 220. More specifically, the mixed modulation decoding circuit 222 determines by majority vote which bursts of the logical channel 214 are valid and which are invalid (e.g., rejected). The mixed modulation decoding circuit 222 selectively accesses bursts of coded bits of the logical channel 214 stored in the block of contiguous data 218 based on the whether the burst is a valid burst or a rejected burst. More specifically, the mixed modulation decoding circuit 222 accesses burst memory locations of the block of contiguous data 218 containing bursts that are valid and avoids accessing burst memory locations of the block of contiguous data 218 containing bursts that are rejected.

The mixed modulation decoding circuit 222 generates output information 224. The output information 224 is based on the valid bursts and zero confidence information. The zero confidence information is used by the mixed modulation decoding circuit 222 in place of the rejected bursts when decoding the logical channel 214. The output information 224 is communicated to a user interface 226 such as a display, speaker, or other suitable user interface.

Accordingly, the mixed modulation decoding circuit 222 does not overwrite the rejected bursts of coded bits and does not adjust memory locations of each burst of coded bits in the system memory 216. Therefore, the mixed modulation decoding circuit 222 provides a more efficient and streamlined method of decoding bursts of coded bits than conventional methods.

Figure 3:
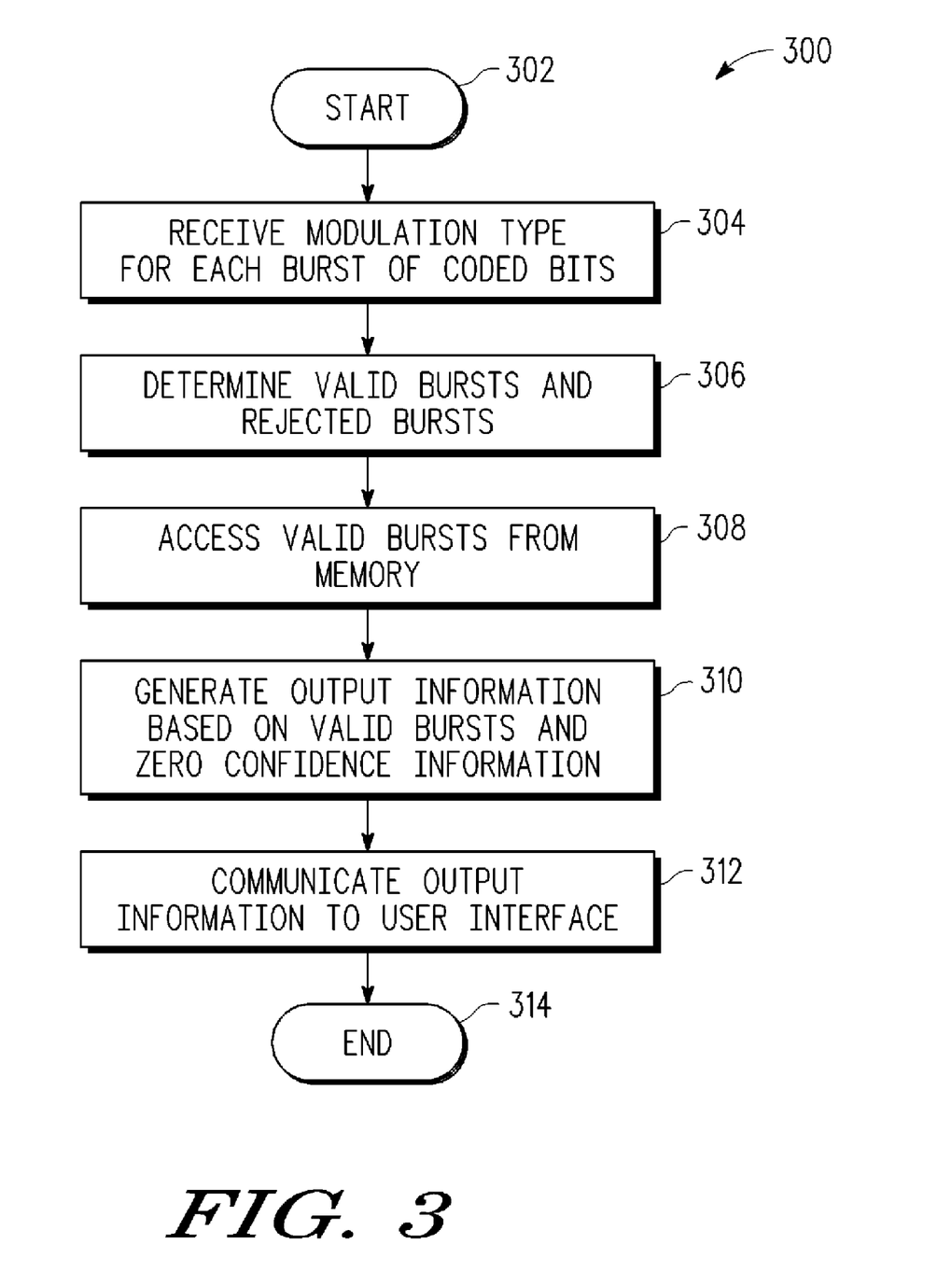
FIG. 3 is a flowchart depicted exemplary steps that can be taken by the mixed modulation decoding circuit.

Referring now to FIG. 3, exemplary steps that can be taken by the mixed modulation decoding circuit 222 are generally identified at 300. The process starts in step 302 when the demodulator 212 demodulates the modulated logical channel 106 into the logical channel 214 that includes multiple bursts of coded bits and determines the modulation type 220 of each of the bursts. In step 304, the mixed modulation decoding circuit 222 receives the modulation type 220 from the demodulator 212. The mixed modulation decoding circuit 222 determines which bursts of the logical channel 214 are valid bursts and which are invalid (e.g., rejected) bursts based on the modulation type 220. As previously discussed, this determination can be made by a majority vote.

In step 308, the mixed modulation decoding circuit 222 accesses valid bursts from the block of contiguous data 218 and avoids accessing the rejected bursts from the block of contiguous data 218. The mixed modulation decoding circuit 222 generates the output information 224 based on the valid bursts obtained from the block of contiguous data 218 and zero confidence information used in place of the rejected bursts. Zero confidence information is information that represents that there is low confidence that the burst is valid. The output information 224 is communicated to the user interface 226 in step 312. The process ends in step 314.

Figure 4:
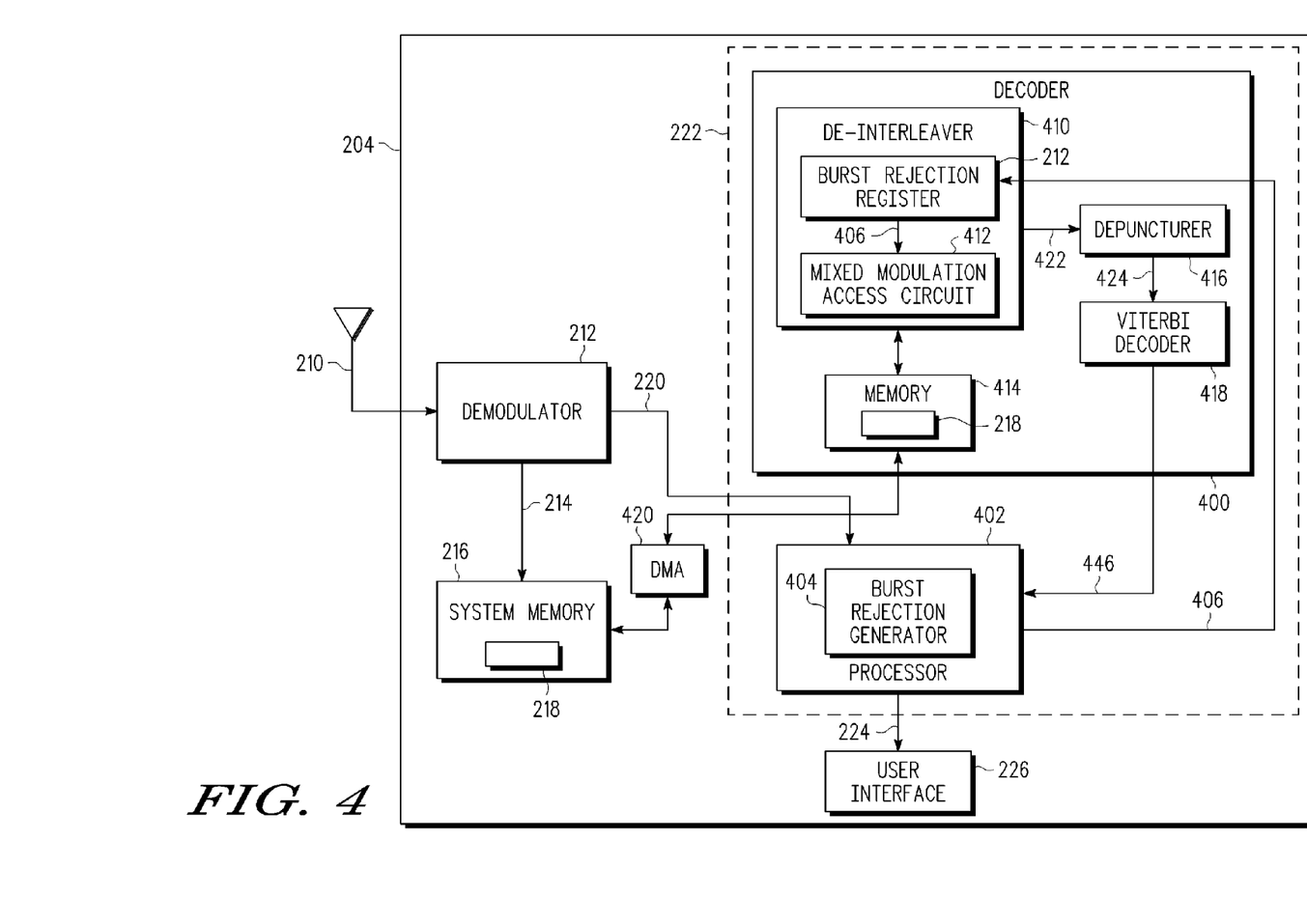
FIG. 4 is an exemplary functional block diagram of the mixed modulation decoding circuit.

Referring now to FIG. 4, an exemplary functional block diagram the mixed modulation decoding circuit 222 is depicted. The mixed modulation decoding circuit 222 includes a decoder 400 and a processor 402 such as a DSP or other suitable processor. The decoder 400 is operatively coupled to the system memory 216 and the processor 402. The processor 402 is operatively coupled to the demodulator 212 and the decoder 400.

The processor 402 includes a burst rejection generator 404. The burst rejection generator 404 (e.g., executing code that is executing on processor 402) receives the modulation type 220 for each burst of the logical channel 214 and generates burst rejection information 406 based thereon. More specifically, the burst rejection generator 404 determines by majority vote which bursts of the logical channel 214 are valid and which bursts are invalid (e.g., rejected). The burst rejection generator 404 generates burst rejection information 406 based on the determination. The burst rejection information 406 includes information that indicates whether each burst of the logical channel 214 is valid or invalid (e.g., rejected).

The decoder 400 includes a de-interleaver 410 that includes a burst rejection register 411 and a mixed modulation memory access circuit 412, memory 414, a depuncturer 416, and a viterbi decoder 418. The burst rejection register 408 is operatively coupled to the processor 406 and the de-interleaver 410. The de-interleaver 410 is operatively coupled to the burst rejection register 408, memory 414, and the depuncturer 416. The viterbi decoder 418 is operatively coupled to the depuncturer 416 and the processor 402.

The burst rejection register 408 receives the burst rejection information 406 from the burst rejection generator 404 and stores the burst rejection information 406. The block of contiguous data 218 in system memory 126 in transferred to memory 414 of the decoder via, for example, a direct memory access circuit (DMA) 420. The mixed modulation memory access circuit 412 selectively accesses burst memory locations of the block of contiguous data 218 based on the burst rejection information 406. More specifically, the mixed modulation address generator 412 accesses burst memory locations of the block of contiguous data 218 that contain a valid burst of coded bits and avoids accessing burst memory locations of the block of contiguous data 218 that contain an invalid (e.g., rejected) burst of coded bits.

The de-interleaver 410 generates de-interleaved information 422 based on the valid burst of coded bits and zero confidence information. The zero confidence information is used by the de-interleaver 410 in place of the rejected bursts when de-interleaving the logical channel 214.

The depuncturer 416 receives the de-interleaved information 422 and generates depunctured information based thereon. More specifically, the depuncturer 416 inserts zero confidence bits in locations where the transmitting device 202 punctured each burst of coded bits (i.e., removed some parity bits) prior to transmission using a puncturing process known in the art.

The viterbi decoder 418 receives the depunctered information 422 and generates the decoded information 446 based thereon. More specifically, the viterbi decoder 418 divides the depunctered information 422 into blocks estimating the most likely sequence of information and generates the decoded information 446 based thereon. The decoded information 446 is processed by the processor 402 to generate the output information 224, which is communicated to the user interface 226.

Figure 5:
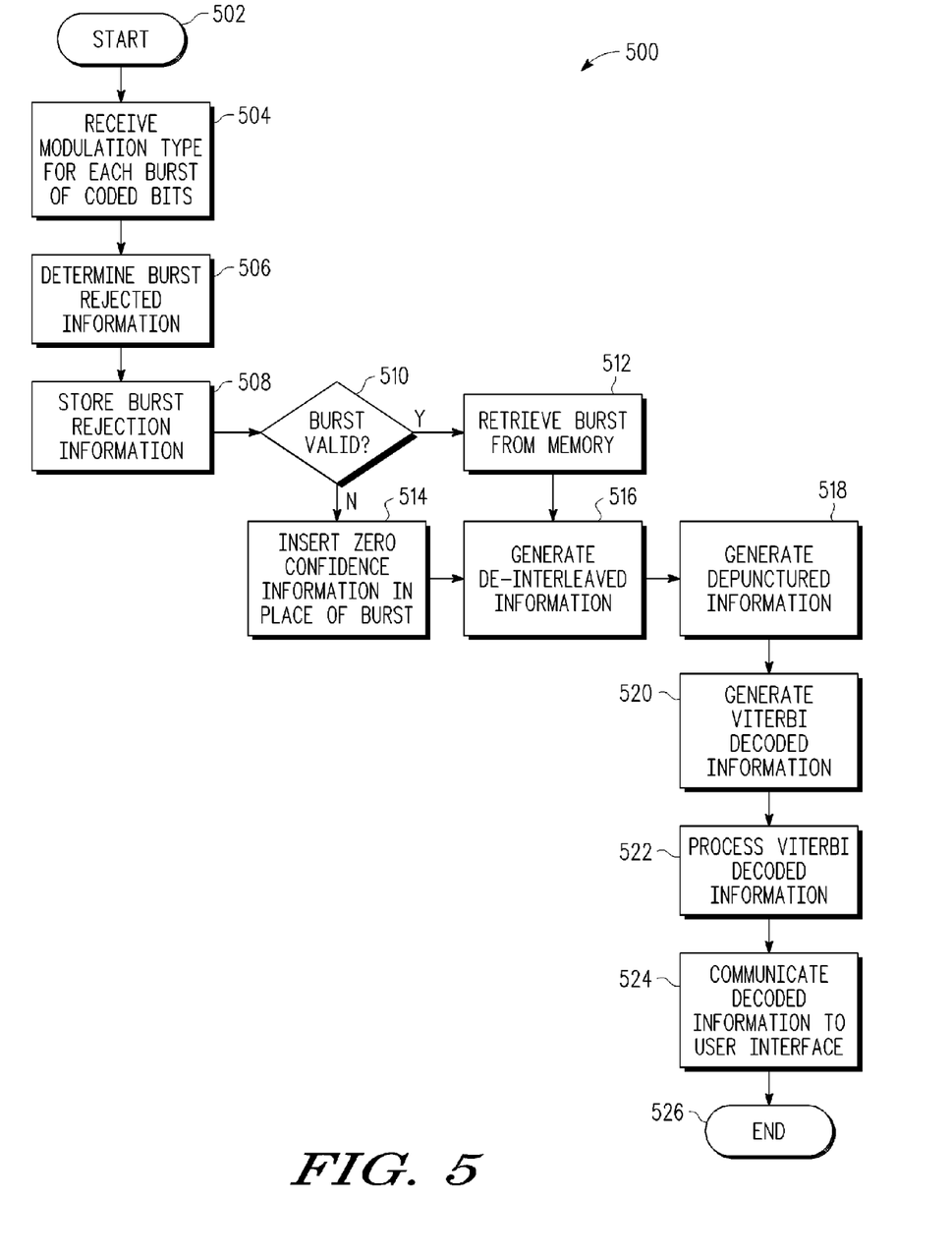
FIG. 5 is a flowchart depicting exemplary steps that can be taken by the mixed modulation decoding circuit having a mixed modulation memory access circuit.

Referring now to FIG. 5, exemplary steps that can be taken by the mixed modulation decoding circuit 222 having the mixed modulation memory access circuit 412, the burst rejection register 411, and the burst rejection generator 404 are generally identified at 500. The process starts in step 502 when the demodulator 212 demodulates the modulated logical channel 106 into the logical channel 214 and determines the modulation type 220 for each of the bursts of coded bits included in the logical channel 214. In step 504, the processor 402 receives the modulation type 220 from the demodulator 212. In step 506, the burst rejection generator 404 determines the burst rejection information 406 based on the modulation type 220. The processor 402 stores the burst rejection information 406 in the burst rejection register 411 in step 508.

In step 510, the mixed modulation memory access circuit 412 determines whether a burst of coded bits is valid based on the burst rejection information 406. If the burst is valid, the mixed modulation memory access circuit 412 accesses a memory location that contains the valid burst and retrieves the burst from the block of contiguous data 218. However, if the mixed modulation memory access circuit 412 determines that the burst is rejected, the mixed modulation memory access circuit 412 avoids accessing memory and inserts zero confidence information in place of the rejected burst in step 514. The mixed modulation memory access circuit 412 generates the de-interleaved information 422 based on the valid bursts and/or the zero confidence information in step 516.

In step 518, the depuncturer 416 receives the de-interleaved information 422 and generates the depunctured information 424 based thereon. In step 520, the viterbi decoder 418 receives the depunctured information 424 and generates the decoded information 426 based thereon. In step 522, the processor 402 processes the decoded information 426 and generates the output information 224 based thereon. The output information 224 is communicated to the user interface 226 in step 524. The process ends in step 526.

Figure 6:
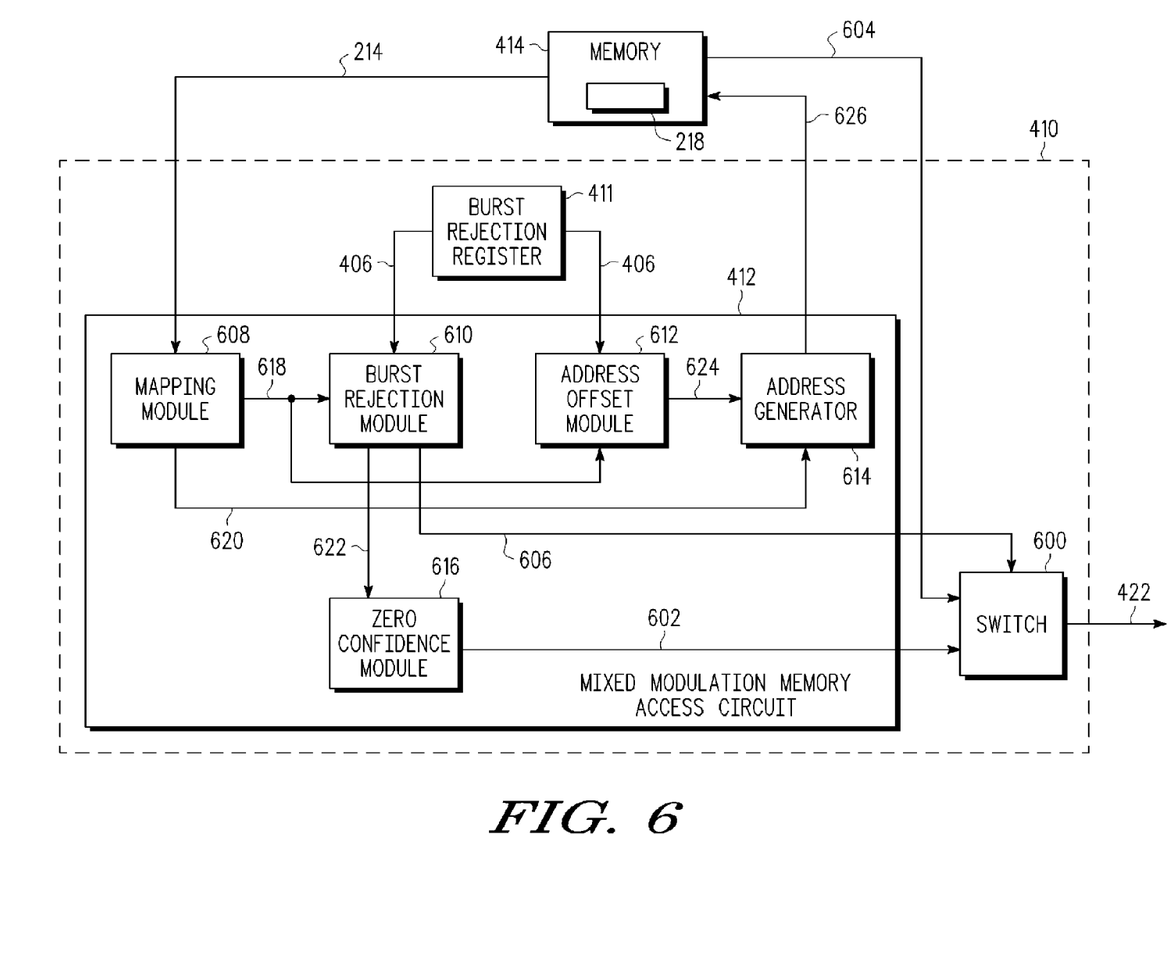
FIG. 6 is an exemplary functional block diagram of the mixed modulation memory access circuit.

Referring now to FIG. 6, an exemplary functional block diagram of the de-interleaver 410 is depicted. In this example, the de-interleaver 410 includes the burst rejection register 411, the mixed modulation memory access circuit 412, and a switch 600. The switch 600 receives zero confidence information 602, a valid burst of coded bits 604, and a switch control information 606. The switch 600 outputs the de-interleaved information 422 based on the zero confidence information 602, the valid burst of coded bits 604, and the switch control information 606. More specifically, the switch 600 outputs the valid burst of coded bits 604 for the de-interleaved information 422 when the switch control information 606 sets the switch 600 to operate in a first state (e.g. "on") and outputs the zero confidence information 602 when the switch control information 606 sets the switch 600 to operate in a second state (e.g. "off"). Although the first state is "on" and the second state is "off" in this example, skilled artisans will recognize that the first and second states can be other complementary discrete states.

The mixed modulation memory access circuit 412 includes a mapping module 608, a burst rejection module 610, an address offset module 612, an address generator 614, and a zero confidence module 616. The mapping module 608 is operatively coupled to memory 414 and the burst rejection module 610. The burst rejection module 610 is operatively coupled to the burst rejection register 411, the zero confidence module 616, and the switch 600. The address offset module 612 is operatively coupled to the mapping module 608, the address generator 614, and the burst rejection register 411. The address generator 614 is operatively coupled to the address offset module 612, memory 414, and the mapping module 608.

The mapping module 608 receives the logical channel 214 of coded bits (e.g., as a stream of information) from memory 414 and assigns each coded bit a burst identifier 618 and a bit identifier 620. The burst rejection module 610 determines whether a burst of coded bits is valid or rejected based on the burst identifier 618 and the burst rejection information 406. More specifically, the burst rejection module 610 compares the burst identifier 618 to the burst rejection information 406 and determines whether the burst of coded bits is valid or rejected based on the caparison. In some embodiments, the burst rejection module 610 uses an exclusive or (XOR) operation to compare the burst identifier 618 to the burst rejection information 406, however other comparison methods are contemplated.

If the burst rejection module 610 determines that the burst of coded bits is valid, the switch control information 606 sets the switch 600 to operate in the first state (e.g. "on"). However, if the burst rejection module 610 determines that the burst of coded bits is rejected, the burst rejection module 610 sets the switch 600 to operate in the second state (e.g. "off") and generates a zero confidence enable signal 622. As previously discussed, the first and second states can be other suitable complementary states. The zero confidence module 616 generates the zero confidence information 602 when the zero confidence enable signal 622 is received from the burst rejection module 610.

The address offset module 612 generates address offset information 624 based on the burst identifier 618 and the burst rejection information 406. If the burst of coded bits is a GMSK burst, the address offset information 624 is 116 bits since each burst of GMSK has 116 coded bits. However, if the burst of coded bits is an 8PSK burst, the address offset information 624 is 348 bits since each burst of 8PSK has 348 coded bits. The address offset module 612 can determine the type of coded bit (e.g., GMSK or 8PSK) based on the burst rejection information 406 stored in the burst rejection register 411.

The address generator 614 generates a memory read address 626 for a valid burst based on the offset address information 624 and the bit identifier 620. The memory read address 626 can be used to access memory locations of the block of contiguous data 218 to read the valid burst of coded bits 604.

Figure 7:
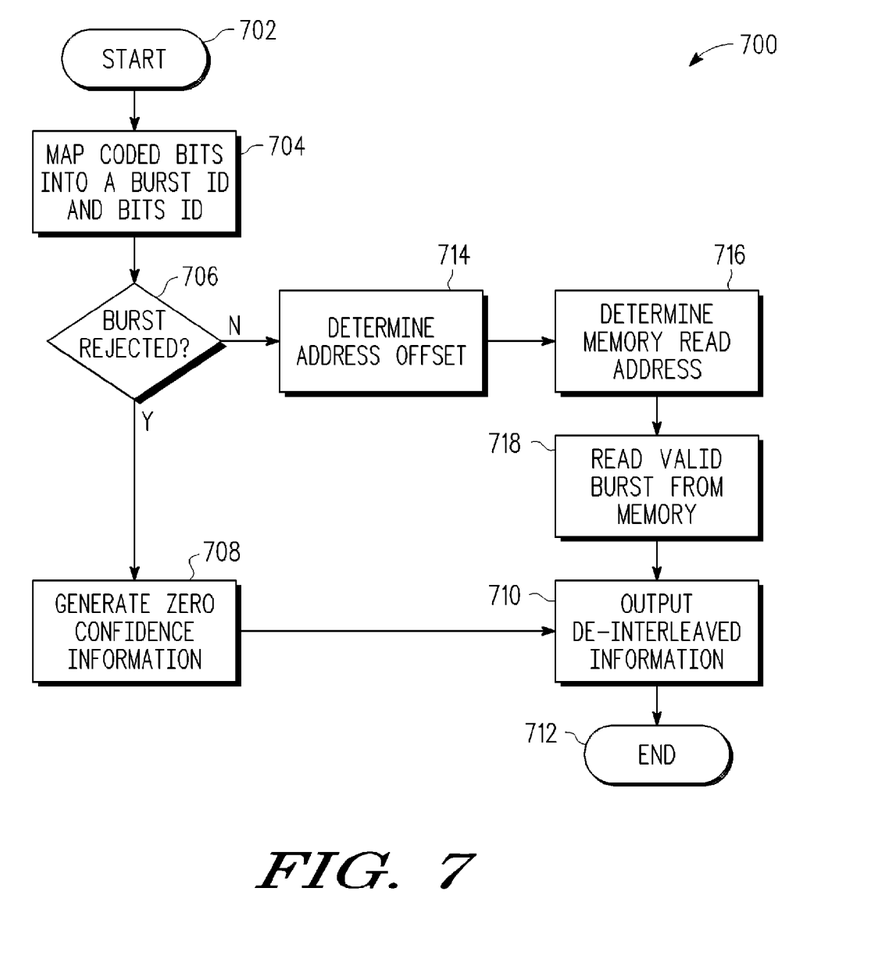
FIG. 7 is a flowchart depicting exemplary steps that can be taken by a de-interleaver or other circuit having the mixed modulation memory access circuit.

Referring now to FIG. 7, exemplary steps that can be taken by the de-interleaver 410 are generally identified at 700. The process starts in step 702. In step 704, the mapping module 608 maps the logical channel 214 of coded bits into the burst identifier 618 and the bit identifier 620. In step 706, the burst rejection module 610 determines whether the burst of coded bits is a rejected burst based on the burst rejection information 406 stored in the burst rejection register 411. If the burst is rejected, the zero confidence module 616 generates zero confidence information 602 in step 708. In step 710, the de-interleaver 410 outputs de-interleaved information 710 that includes the zero confidence information 602. The process ends in step 712.

However, if the burst rejection module 610 determines that the burst of coded bits is a valid burst (i.e., not rejected) in step 706, the address offset module 612 determines the address offset 624 based on the burst identifier 618 and the burst rejection information 406 in step 714. In step 716, the address generator 614 generates the memory read address 626 for a valid burst of coded bits based on the offset address information 624 and the bit identifier 620 in step 716. In step 718, the mixed modulation memory access circuit 412 accesses and reads the valid burst of coded bits 604 from memory 414 based on the memory read address 626. In step 710, the de-interleaver 410 outputs de-interleaved information 422 that includes the valid burst of coded bits 604. The process ends in step 712.

As noted above, among other advantages, the mixed modulation decoding circuit 222 selectively accesses burst memory locations containing a valid burst of coded bits and avoids accessing burst memory locations containing a rejected burst of coded bits. The mixed modulation decoding circuit 222 provides a more efficient and streamlined method of decoding bursts of coded bits since rejected bursts of coded bits are not overwritten. In addition, the mixed modulation decoding circuit 222 is more efficient and streamlined since memory locations of each burst of coded bits are not adjusted to ensure that they are contiguous in system memory. Other advantages will be recognized by those of ordinary skill in the art.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims. In addition, unless stated otherwise, terms such as "first" and "second" are used to arbitrarily distinguish between the elements such terms describe. Thus, these terms are not necessarily intended to indicate temporal or other prioritization of such elements.

What is claimed is:

1. A decoding circuit, comprising:
   a mixed modulation memory access circuit, responsive to burst rejection information, that is operative to selectively access burst memory locations containing a valid burst of coded bits and to avoid accessing burst memory locations containing a rejected burst of coded bits based on the burst rejection information.

2. The decoding circuit of claim 1 wherein the mixed modulation memory access circuit accesses a valid burst when the burst rejection information indicates that the memory location contains valid bursts and the mixed modulation memory access circuit generates zero confidence information when the burst rejection information indicates that the memory location contains rejected bursts.

3. The decoding circuit of claim 2 further comprising:
   a depuncturer that is operative to generate depunctured information based on at least one of the valid burst and the zero confidence information; and
   a decoder that is operative to generate decoded information based on the depunctured information.

4. The decoding circuit of claim 1 further comprising a burst rejection register, operatively coupled to the mixed modulation memory access circuit, that is operative store the burst rejection information.

5. The decoding circuit of claim 1 further comprising memory, operatively coupled to the mixed modulation memory access circuit, that is operative to store a contiguous block of coded bits, wherein the contiguous block of coded bits includes at least one of the valid burst of coded bits and the rejected burst of coded bits.

6. The decoding circuit of claim 5 wherein the burst rejection information indicates whether a burst of coded bits stored in the contiguous block is one of valid and rejected.

7. The decoding circuit of claim 6 wherein the burst of coded bits is valid when a majority of coded bits stored in the contiguous block have a same modulation type as the burst of coded bits.

8. The decoding circuit of claim 1 wherein the mixed modulation memory access circuit comprises:
   a mapping module that is operative to assign each coded bit of a stream of coded bits a burst identifier and a bit identifier;
   a burst rejection module, operatively coupled to the mapping module, that is operative to determine whether a burst of coded bits is one of valid and rejected based on the burst rejection information and the burst identifier;

an address offset module that is operative to determine a memory address offset based on the burst identifier and the burst rejection information; and an address generator, operatively coupled to the address offset module, that is operative to determine a memory read address based on the memory address offset and the bit identifier, wherein the mixed modulation memory circuit accesses the burst memory locations containing the valid burst based on the memory read address.

9. A mixed modulation decoding circuit, comprising:

a processor that includes a burst rejection generator that is operative to generate burst rejection information based on a modulation type for each burst of coded bits of a logical channel; and a decoding circuit that is operative to generate decoded information by selectively accessing burst memory locations containing a valid burst of coded bits and by avoiding accessing burst memory locations containing a rejected burst of coded bits based on the burst rejection information.

10. The mixed modulation decoding circuit of claim 9 wherein the decoding circuit comprises:

a mixed modulation memory access circuit that accesses memory locations when the burst rejection information indicates that the memory location contains the valid burst and that generates zero confidence information when the burst rejection information indicates that that the memory location contains the rejected burst; and a burst rejection register, operatively coupled to the mixed modulation memory access circuit, that is operative to store the burst rejection information.

11. The mixed modulation decoding circuit of claim 10 wherein the decoding circuit further comprises:

memory, operatively coupled to the mixed modulation memory access circuit, that is operative to store a contiguous block of coded bits, wherein the contiguous block includes at least one of the valid burst of coded bits and the rejected burst of coded bits;

a depuncturer that is operative to generate depunctured information based on at least one of the valid burst of coded bits and the zero confidence information; and a decoder, operatively coupled to the depuncturer, that is operative to generate the decoded information based on the depunctured information.

12. The mixed modulation decoding circuit of claim 9 wherein the burst rejection information indicates whether each burst is one of valid and rejected.

13. The mixed modulation decoding circuit of claim 12 wherein the burst rejection generator determines whether a burst is one of valid and rejected based on a majority vote of the modulation type for each burst of coded bits.

14. The mixed modulation decoding circuit of claim 9 wherein the decoded information is processed by the processor to generate output information for a user interface.

15. A decoding method, comprising:

selectively accessing burst memory locations containing a valid burst of coded bits and avoiding accessing burst memory locations containing a rejected burst of coded bits based on burst rejection information.

16. The method of claim 15 further comprising:

reading the burst memory locations containing the valid burst when the burst rejection information indicates that the memory location contains valid bursts; and generating zero confidence information when the burst rejection information indicates that the memory locations contain rejected bursts.

17. The method of claim 16 further comprising:

generating depunctured information based on at least one of the valid burst and the zero confidence information; and generating decoded information based on the depunctured information.

18. The method of claim 15 further comprising storing the burst rejection information in a burst rejection register.

19. The method of claim 15 further comprising storing a contiguous block of coded bits in memory, wherein the contiguous block of coded bits includes at least one of the valid burst of coded bits and the rejected burst of coded bits.

20. The method of claim 19 wherein the burst rejection information indicates whether a burst of coded bits stored in the contiguous block is one of valid and rejected.

21. The method of claim 20 wherein the burst of coded bits is valid when a majority of coded bits stored in the contiguous block have a same modulation type as the burst of coded bits.

22. The method of claim 15 comprising:

receiving bursts of coded bits via a wireless channel; and storing the received bursts of coded bits in memory.

* * * * *